United States Patent

Bensman et al.

[11] Patent Number: 5,920,623
[45] Date of Patent: Jul. 6, 1999

[54] METHOD AND APPARATUS FOR DEFEATING A PREDICTIVE TELEMARKETING SYSTEM

[75] Inventors: Robert M. Bensman, Rocky River; Bruce R. Knox, Kirtland Hills, both of Ohio

[73] Assignee: Vera-A-Fast, Rocky River, Ohio

[21] Appl. No.: 08/877,982

[22] Filed: Jun. 18, 1997

[51] Int. Cl.⁶ .................................................. H04M 1/00
[52] U.S. Cl. ........................................... 379/361; 379/353
[58] Field of Search ..................................... 379/199, 353, 379/354, 355, 361, 93.02, 93.03, 213, 7

[56] References Cited

U.S. PATENT DOCUMENTS

| | | | |
|---|---|---|---|
| 4,401,860 | 8/1983 | Walls . | |
| 4,737,720 | 4/1988 | Mills | 327/106 |
| 4,845,743 | 7/1989 | Lutz | 379/199 |
| 5,259,022 | 11/1993 | Kuok et al. | 379/67 |
| 5,721,771 | 2/1998 | Higuchi et al. | 379/381 |
| 5,796,816 | 8/1998 | Utsumi | 379/381 |

*Primary Examiner*—N. Le
*Assistant Examiner*—Shih-Wen Hsieh
*Attorney, Agent, or Firm*—Renner, Kenner, Greive, Bobak, Taylor & Weber

[57] ABSTRACT

A method and apparatus for defeating a predictive dialing telemarketing system includes a signal generator in the nature of an oscillator (18) that is capable of creating a 914 Hz sine wave that substantially imitates the first tone of an intercept Special Information Tone used by the telephone network to indicate a nonworking number. The oscillator (18) is amplified with an amplifier (22). The imitation signal is selectively sent in response to the incoming call when a controller (12) closes a relay (20) to connect the imitation signal to the telephone line (16). The controller (12) is prompted to close the relay (20) by an off-hook detector (14) that indicates to the controller (12) when a voice signal is established.

13 Claims, 1 Drawing Sheet

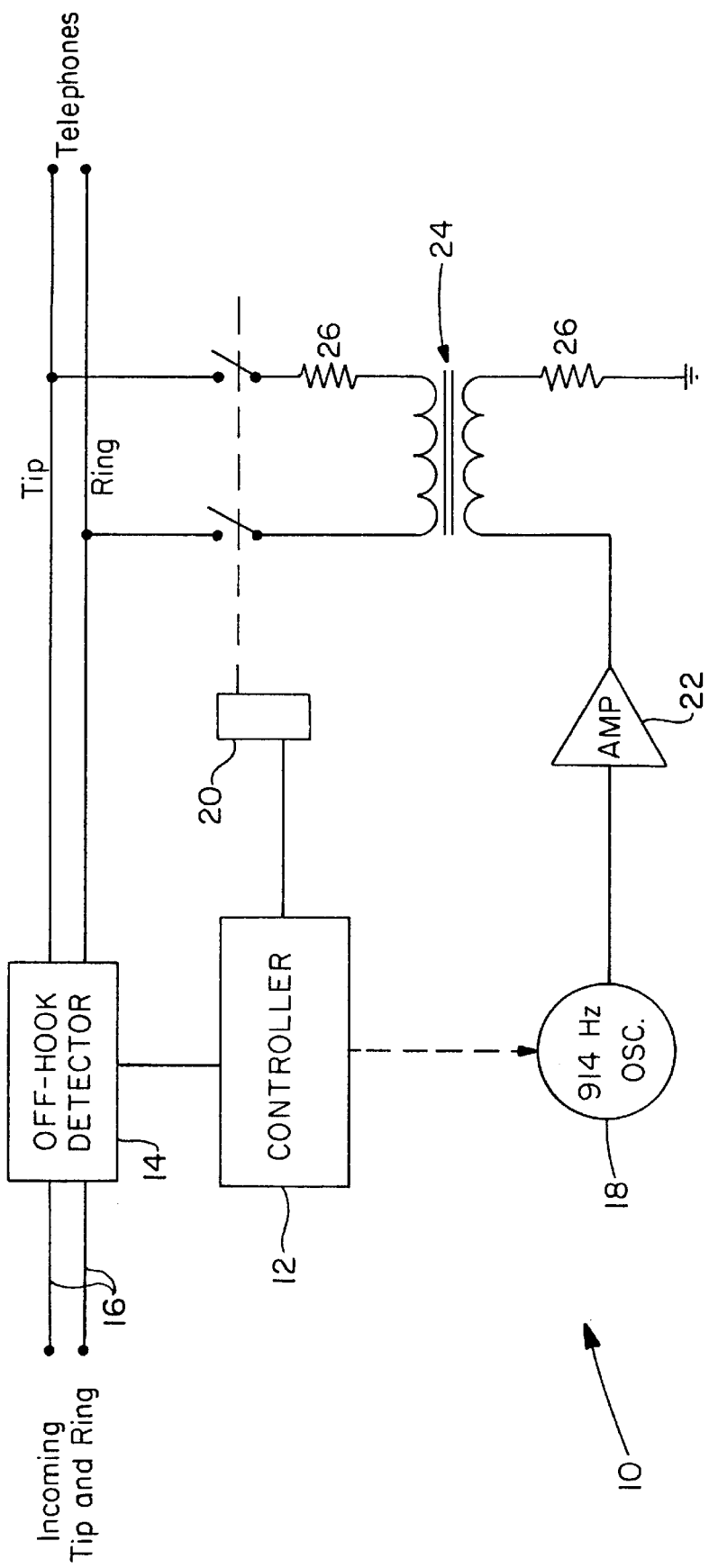

METHOD AND APPARATUS FOR DEFEATING A PREDICTIVE TELEMARKETING SYSTEM

TECHNICAL FIELD

This invention relates to the field of telephony and more particularly to a method and apparatus for defeating a predictive dialing telemarketing system. Specifically, the present invention relates to a method and apparatus for automatically terminating phone calls placed by a predictive dialer by sending a special information tone to the predictive dialer when the telephone receiving the call is taken off the hook.

BACKGROUND OF THE INVENTION

Telemarketing has increased exponentially in recent times. Many people targeted by telemarketers do not desire to receive or answer the telemarketing calls. Thus, it is desirable in the art to provide a method and apparatus that may be used to block telemarketing calls.

One method for preventing some telemarketing calls is to have your telephone number removed from the dialing list of the telemarketer. This method, however, involves effort and is only partially effective because new calling lists are constantly generated which reestablish your number as a target.

Another method to block calls is to simply take your phone off the hook when telemarketing calls are undesired. Such a method is undesirable because the method does not permit desired calls to be connected and received. The method also causes the phone to emit a loud off-hook warning signal that may annoy the owner of the phone. Instead of leaving the phone off the hook, a person may use an answering machine or a caller identification device to screen calls. Both of these methods are undesirable because some people do not leave messages, and some numbers cannot be identified by the caller identification device.

In view of these deficiencies, other devices have been developed in the art to permit selective blocking of calls. For instance, U.S. Pat. No. 5,467,388 discloses a method and apparatus for selectively blocking incoming calls. The patent discloses an apparatus that may be programmed to selectively block calls either by time block or by number. The user must, however, spend time to program the system and remember to activate it when the blocking function is desired. Such steps are generally undesired due to the effort required by the user. Thus, a method and apparatus that automatically blocks calls placed from a predictive dialing telemarketing system is highly desirable. Further, the method and apparatus should not require any preprogramming or activation steps. Also, the system must allow desired calls to be connected while still blocking undesired calls.

To more fully understand the concepts of the present invention, it should be understood that most large-scale automated telemarketing systems use predictive or auto-dialers to place the phone calls. These dialers obtain a number to be called from a computer database and place the telemarketing calls for the operator. If a call is connected and a live person responds, the system immediately connects the call to a salesperson operator or solicitor who makes a presentation. If the line is unanswered, busy, or answered by an answering machine, the system flags the number and returns to the number at a later time and recalls it. In this manner, the telemarketing system continues to call all programmed numbers until a live person answers. The system also does not waste time having the operator place unanswered calls.

In other situations where the called number has been disconnected or is otherwise no longer in service, the system removes the number from its computer database. The computer differentiates the status of the number by recognizing Special Information Tones (SITs) used in the U.S. telephone network. The network uses the SITs to provide information to computers in the network. SITs are three precise, sequential tones used to identify recorded announcements provided for ineffective call attempts in the telephone network. There are seven major SIT types known as SIT1 through SIT7. A telemarketing system is designed to maximize outbound calls and maximize completed calls. Thus, most quality telemarketing systems are designed to recognize SITs. One of the most common SITs is SIT2 which is the intercept SIT. The intercept SIT is used to describe an uncompleted call attempt due to a nonworking number. The intercept SIT begins with a tone of 913.8 Hz that is played for 274 milliseconds. This tone is followed by a second tone of 1370.6 Hz played for 274 milliseconds and completed with a third tone at 1776.7 Hz played for 380 milliseconds. When this SIT is received by a telemarketing system using a predictive dialer, the system notes that the number called is non-working and removes it from its database so that it will not be called again.

Thus, it is desirable to provide a method and apparatus for creating an imitation intercept SIT and sending this imitation signal in response to all incoming calls to a person's telephone number, thereby causing any predictive dialing telemarketing system to disconnect the call and remove the person's number from the telemarketing system's database.

SUMMARY OF INVENTION

In view of the foregoing, it is a primary aspect of the present invention to provide a method and apparatus for defeating a predictive dialing telemarketing system.

Another aspect of the present invention is to provide a method and apparatus for defeating a predictive dialing telemarketing system that includes sending an intercept SIT to the system when a phone is taken off hook.

A further aspect of the present invention is to provide a method and apparatus for defeating a predictive dialing telemarketing system, as above, that is capable of creating multiple-tone SITs.

Another aspect of the present invention is to provide a method and apparatus for defeating a predictive dialing telemarketing system, as above, that causes the telemarketing system to remove the called number from its database.

Still another aspect of the present invention is to provide a method and apparatus for defeating a predictive dialing telemarketing system, as above, that conforms to FCC and local telephone company standards.

Yet another aspect of the present invention is to provide a method and apparatus for defeating a predictive dialing telemarketing system, as above, that can be used as a stand-alone, plug-in device.

Still a further aspect of the present invention is to provide a method and apparatus for defeating a predictive dialing telemarketing system, as above, that can be built into any telephone.

Yet a further aspect of the present invention is to provide a method and apparatus for defeating a predictive dialing telemarketing system, as above, that can be built into any answering machine.

Another aspect of the present invention is to provide a method and apparatus for defeating a predictive dialing telemarketing system, as above, that can be incorporated into a multi-line telephone system that is typically found in many businesses.

These and other aspects of the invention will become apparent to those skilled in the art in light of the following disclosure and accompanying drawing.

These aspects of the present invention are achieved by an apparatus for defeating a predictive dialing telemarketing system that includes a signal generator that generates a signal substantially similar to at least a first part of a Special Information Tone, and a controller that sends the signal to all incoming calls.

The aspects are also achieved by a method for defeating a predictive dialing telemarketing system including the steps of generating a signal that is substantially similar to at least a first part of a Special Information Tone, and sending the signal in response to all incoming telephone calls.

To acquaint persons skilled in the arts most closely related to the present invention, one preferred embodiment of a method and apparatus for defeating a predictive dialing telemarketing system that illustrates a best mode now contemplated for putting the invention into practice is described herein by, and with reference to, the annexed drawing that forms a part of the specification. The exemplary method and apparatus is described in detail without attempting to show all of the various forms and modifications in which the invention might be embodied. As such, the embodiment shown and described herein is illustrative, and as will become apparent to those skilled in these arts, can be modified in numerous ways within the spirit and scope of the invention; the invention being measured by the appended claims and not by the details of the specification.

BRIEF DESCRIPTION OF THE DRAWING

For a complete understanding of the objects, techniques, and structure of the present invention, reference should be made to the following detailed description and the accompanying drawing which is a schematic diagram of the apparatus used to accomplish the concepts of the present invention.

PREFERRED EMBODIMENT FOR CARRYING OUT THE INVENTION

In general, the concept of the present invention is to imitate a telephone network Special Information Tone (SIT) and send the SIT over the phone line each time a voice signal is created when a phone is taken off hook. The SITs are sine wave signals that are sent at a predetermined frequency and duration. The frequencies and durations of the SITs are generally known in the art and may be obtained from numerous sources including, for example, the Audichron Operator's Manual 0M10–0022. The apparatus of the present invention has the capability of playing each of the SIT sequences in full or, when desired, a subset thereof. As such, the apparatus has the capability to run through all of the SITs in full or simply a first tone of any given SIT. This is particularly useful because many telemarketing systems will, in the interest of conserving time, determine that a full SIT sequence has been received after the first tone in that sequence has been detected. Thus, it may only be necessary to send the first tone in the sequence. As such, a predictive dialing telemarketing system is said to be "defeated" because the imitation SIT signal will cause the telemarketing system to immediately disconnect the call and remove the number from its database.

There are four major approaches for using the method and apparatus of the present invention. First, the apparatus may be built into an answering device so that the SIT tones are sent immediately before any recorded announcement is sent. Second, the device may be contained in a plug-in device and may be connected to a telephone line such that the SITs are sent whenever an incoming call has been answered. In this situation, the originator and recipient of the call will likely hear the SITs when the call is answered. Third, the apparatus may be built into a multi-line, business-type phone bank such that the SIT is sent over each incoming line. Lastly, the apparatus may be built directly into a telephone such that the SITs are sent whenever a call is answered. The SITs function equally well in cordless and wireless telephones.

An apparatus for defeating a predictive dialing telemarketing system is depicted schematically in the figure and is indicated generally by the numeral 10. The apparatus 10 includes a controller 12 that is in communication with an off-hook detector 14 that is in communication with the incoming and outgoing telephone line 16 of the telephone system. The apparatus 10 also includes a signal generator 18 that is capable of creating signals that successfully imitate SITs. In the embodiment of the invention depicted in the figure, the signal generator 18 is an oscillator that creates a 914 Hz sine wave. This signal is substantially the first segment of an intercept SIT (SIT2) which is used by the telephone network to indicate a nonworking number.

In general, the apparatus 10 functions by sending an imitation SIT into the phone line 16 whenever a telephone is taken off hook. This is accomplished when the off-hook detector 14 detects that a phone has been taken off hook. The controller 12 receives the signal from the off-hook detector 14 and takes the steps or performs the functions necessary to send the signal produced by the signal generator 18 into the phone line 16. By doing so, most predictive dialing telemarketing systems calling the number will received the SIT and disconnect or terminate the call, and thus be defeated.

In the embodiment of the invention depicted in the drawing, the controller sends the imitation SIT into the phone line 16 by activating a relay 20 that connects the signal directly into the phone line 16. The signal generator 18 is connected to an amplifier 22 such that the signal produced by the signal generator 18 may be amplified to a level that imitates the SITs used by the telephone network. The amplified signal then may be transformed by a transformer 24 before it is sent into the telephone line 16 so that the apparatus 10 conforms with all FCC and telephone system regulations. As such a the transformer 24 includes a pair of resistors 26 and 28 that may be 600 ohm resistors.

The apparatus 10 thus constantly generates the imitation SIT signal through the signal generator 18 and only connects the SIT signal to the phone line 16 when the controller 12 closes the relay 20. In another embodiment of the present invention, the controller 12 may create the imitation SIT signal by controlling the oscillator 18 through the dashed control line and selectively direct that SIT signal into the phone line 16. In such a system, the oscillator 18 would be a programmable audio sine wave oscillator which, for the application presented herein would be controlled to emit an audio sine wave at 914 Hz. In a further embodiment, the controller 12 may recognize that an incoming call has caused the phone to ring. The controller 12 then transmits the imitation SIT signal to the incoming call. However, the controller 12 does not send the signal when the phone employing the apparatus 10 is used to place a call. In yet another embodiment of the invention, the signal generator 18 may be capable of generating all or part of each of the known SITs. It is also contemplated that the controller 12 may be used to create all or part of each of the known SITs.

Thus it should be evident that the device and methods of the present invention are highly effective for defeating a predictive dialing telemarketing system. Based upon the foregoing disclosure, it should now be apparent that the use of the apparatus described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, signal generators according to the present invention are not necessarily limited to those having an oscillator and an amplifier. Moreover, as noted hereinabove, other means for selectively sending the imitation signal can be substituted for the controller. Thus, the scope of the invention shall include all modifications and variations that may fall within the scope of the attached claims.

What is claimed is:

1. An apparatus in communication with a telephone line for defeating predictive dialing telemarketing systems that remove telephone numbers from their systems that respond with a Special Information Tone, comprising:

a signal generator that generates a false signal substantially similar to at least a first part of a Special Information Tone, an off-hook detector, and a controller in communication with said off hook detector that sends said false signal in response to all answered incoming calls on the telephone line.

2. An apparatus according to claim 1, further comprising a relay in communication with said controller, said relay having an open position and a closed position, said signal generator being in communication with the telephone line when said relay is in said closed position.

3. An apparatus according to claim 1, further comprising an amplifier connected to said signal generator.

4. An apparatus according to claim 1, further comprising a transformer connected to said signal generator.

5. An apparatus according to claim 1, wherein said controller is capable of generating a signal.

6. An apparatus according to claim 5, wherein said controller is capable of generating multiple-tone signals.

7. An apparatus according to claim 1, wherein said signal is a 914 Hz sine wave.

8. An apparatus according to claim 1, wherein said signal generator is capable of generating multiple-tone signals.

9. An apparatus according to claim 1, wherein said controller is connected to and selectively activates said signal generator.

10. A method for defeating predictive dialing telemarketing systems that remove telephone numbers from their systems that respond with a Special Information Tone, comprising the steps of:

generating a false signal that is substantially similar to at least a part of a Special Information Tone, detecting an off-hook condition in a telephone line, and sending the false signal to all incoming telephone calls upon detection of an off hook condition.

11. A method according to claim 10, further comprising the step of connecting the false signal to a telephone line when an off-hook condition is detected.

12. A method according to claim 10, further comprising the step of generating a multiple-tone false signal that substantially imitates a Special Information Tone.

13. A method according to claim 10, further comprising the step of amplifying the false signal before it is sent.

* * * * *